US012646153B2

(12) United States Patent
Pan et al.

(10) Patent No.:  US 12,646,153 B2
(45) Date of Patent:       Jun. 2, 2026

(54) METHOD AND APPARATUS FOR ACQUIRING CAPSULE SEAM IMAGE, STORAGE MEDIUM AND COMPUTING DEVICE

(71) Applicant: AIACVISION Inc., Cary, NC (US)

(72) Inventors: Jianyue Pan, Beijing (CN); Liwen Zhang, Beijing (CN); Jie Li, Beijing (CN); Deyun Ren, Beijing (CN)

(73) Assignee: AIACVISION Inc., Cary, NC (US)

( * ) Notice:      Subject to any disclaimer, the term of this patent is extended or adjusted under 35 U.S.C. 154(b) by 263 days.

(21) Appl. No.: 18/348,936

(22) Filed:      Jul. 7, 2023

(65)               Prior Publication Data

US 2024/0020795 A1      Jan. 18, 2024

(30)          Foreign Application Priority Data

Jul. 12, 2022    (CN) .......................... 202210813045.5

(51) Int. Cl.
  *G06T 5/70*          (2024.01)
  *G06T 5/20*          (2006.01)
  *G06V 10/56*        (2022.01)
(52) U.S. Cl.
  CPC ................. *G06T 5/70* (2024.01); *G06T 5/20* (2013.01); *G06V 10/56* (2022.01); *G06T 2207/10024* (2013.01); *G06T 2207/20036* (2013.01)
(58) Field of Classification Search
  CPC ... G06T 5/70; G06T 5/20; G06T 2207/10024; G06T 2207/20036; G06T 2207/10068; G06T 2207/20032; G06T 7/12; G06T 7/136; G06T 7/0004; G06T 7/90; G06V 10/56; G06V 20/66
  See application file for complete search history.

(56)                References Cited

U.S. PATENT DOCUMENTS

| | | | | |
|---|---|---|---|---|
| 8,712,163 | B1* | 4/2014 | Osheroff ............ | G06Q 30/0185 424/467 |
| 2013/0329058 | A1* | 12/2013 | Brossette ................. | G06T 7/12 382/165 |
| 2016/0140725 | A1* | 5/2016 | Bergner .................... | G06T 7/13 382/173 |

OTHER PUBLICATIONS

Z. Zhengtao, H. Liuqian and Y. Xiongyi, "Pre-processing Techniques for On-Line Capsule Inspection Based on Machine Vision," 2011 Fourth International Conference on Intelligent Computation Technology and Automation, Shenzhen, China, 2011, pp. 653-656, doi: 10.1109/ICICTA.2011.448. (Year: 2011).*

(Continued)

*Primary Examiner* — Andrew M Moyer
(74) *Attorney, Agent, or Firm* — Westbridge IP LLC

(57)                ABSTRACT

A method for acquiring a capsule seam image includes: acquiring a first image component, where the first image component includes an image component of a capsule seam in a preset channel; in the first image component, the image component of the capsule seam in the preset channel has step change; performing a highlighting process on the first image component according to an insertion direction from the capsule cap to the capsule body to obtain a second image component, where the second image component at least includes an enhanced capsule seam feature; and performing noise reduction and compensation on the second image component to obtain a target image component, where the target image component includes a complete outline of the capsule seam.

8 Claims, 7 Drawing Sheets

(56) References Cited

OTHER PUBLICATIONS

Kekre, H. B., Dhirendra Mishra, and Varun Desai. "Detection of defective pharmaceutical capsules and its types of defect using image processing techniques." 2014 International Conference on Circuits, Power and Computing Technologies [ICCPCT-2014]. IEEE, 2014. (Year: 2014).*

* cited by examiner a     b

101

To-be-detected
capsule image

102

Image acquisition

To-be-detected
capsule

To-be-detected
capsule image

First image
component

Target image
component

METHOD AND APPARATUS FOR ACQUIRING CAPSULE SEAM IMAGE, STORAGE MEDIUM AND COMPUTING DEVICE

CROSS-REFERENCE TO RELATED APPLICATIONS

This application claims priority to Chinese Patent Application No. 202210813045.5, filed on Jul. 12, 2022, the content of which is incorporated herein by reference in its entirety.

TECHNICAL FIELD

The present application relates to the field of capsule detection, and more specifically relates to a method for acquiring a capsule seam image, an apparatus for acquiring a capsule seam image, a storage medium and a computing device.

BACKGROUND

At present, for surface defects of capsules, most domestic pharmaceutical manufacturers use a method of human eye observation to find out defective capsules. This manual detection method not only has a low efficiency and a high cost, but also, due to some inherent factors of human beings, does not have a reliable detection accuracy. Therefore, some manufacturers have begun to introduce machine vision detection devices which are used to perform automatic appearance defect detection in a final stage of capsule preparation. Machine vision has higher precision and efficiency than human eyes, and capsules may not be secondary polluted by manual detection, improving capsule production efficiency and quality.

There are many types of capsule defects, among which a splitting-in-insertion defect is one of the most common defects in the production and preparation of capsules. A production and preparation process of the capsule includes: firstly separating a capsule cap and a capsule body of an empty capsule, secondly filling the capsule body with medicinal powder and then locking the capsule cap and the capsule body. During the locking operation (such as upper and lower capsule holes are not concentric or the capsule itself is deformed), deviation may inevitably occur, which results in the production of the splitting-in-insertion defect. If a color of the capsule body and a color of the capsule cap are two different colors, a feature of the splitting-in-insertion defect is more obvious such that even human beings can find the splitting-in-insertion defect at a glance. However, if the capsule body and the capsule cap have the same color, it is impossible to detect the splitting-in-insertion defect by human eyes and make a detection speed keep up with a speed of an assembly line. It is also difficult for machine vision to detect the splitting-in-insertion defect in a case that the capsule body and the capsule cap have the same color.

The conventional technology adopts two strategies for detecting the splitting-in-insertion defect in a case that the capsule body and the capsule cap have the same color. For a first strategy, it is assumed that the splitting-in-insertion defect definitely results in changes in a size or shape of the capsule, and screening of the splitting-in-insertion defect is implemented by detecting a width, a height and a shape of the capsule. For a second strategy, it is assumed that the capsule can be observed from the side where splitting-in-insertion defect occurs and a structure having the splittingin-insertion defect completely protrudes from an area of the capsule, in this case, the shape of the capsule is quite different from a shape of a normal capsule, and the defect can be detected more easily. However, because the size of the capsule actually has a tolerance of ±0.5 mm, it cannot be concluded that the splitting-in-insertion defect definitely results in a change in the size of the capsule. In addition, the splitting-in-insertion defect cannot be observed from the side every time, and the structure having the splitting-in-insertion defect may be tightly adhered to the surface of the capsule.

In the traditional manual detection method, in addition to human eye observation, a sieve plate is also used. Many round holes specially made according to a diameter of the capsule are arranged on the sieve plate. A diameter of the round hole is usually dozens to hundreds of microns greater than a standard diameter of the capsule. Therefore, only the capsule having a diameter that is not much different from the standard diameter can pass through the sieve plate smoothly. However, this method requires a lot of manual intervention, and a processing speed is limited by the mechanical structure, so the efficiency is low, and the accuracy is also limited by factors such as a machining accuracy.

The machine vision method is described above. In the first strategy, the capsule with out-of-tolerance size and shape is screened out by calculating the length, the width, an outer outline shape and other information of the capsule, such that the capsule with the splitting-in-insertion defect is accurately eliminated. However, according to a capsule specification reference standard, there is a deviation range of ±0.3-0.5 mm in the length of the capsule body, the length of the capsule cap and the length of the whole capsule. In practice, a tolerance range allowed by pharmaceutical manufacturers may be even greater. Therefore, a certain margin must be reserved above and below the standard value for the capsule size that is considered to be normal. If the certain margin is not reserved, the normal production of pharmaceutical factories may be seriously affected. On this basis, the size of the capsule with the splitting-in-insertion defect may still fall within the normal range, then the capsule with the splitting-in-insertion defect is determined to be a qualified capsule, that is, there is a risk of missed detection. The second strategy is based on two assumptions. A first assumption is that the capsule must be observed from the side where the splitting-in-insertion defect occurs. A second assumption is that the structure having the splitting-in-insertion defect completely protrudes from the area of the capsule. If the number of shots for each capsule is large enough, the first assumption can be met in theory, but this may bring the problem of increased calculation. For the second assumption, cases of the splitting-in-insertion defect are various, and final shapes of the structure having the splitting-in-insertion defect are also various. The structure having the splitting-in-insertion defect may completely protrude from the area of the capsule, or may be tightly adhered to the surface of the capsule. It can be seen that in the second strategy only the capsule with a structure having the splitting-in-insertion defect completely protruding from the area of the capsule can be detected, and the capsule with a structure having the splitting-in-insertion defect tightly adhered to the surface of the capsule cannot be detected.

SUMMARY

In this context, the embodiments of the present disclosure is expected to provide a method for acquiring a capsule seam image, an apparatus for acquiring a capsule seam image, a storage medium and a computing device. The splitting-in-insertion defect of the capsule seam may be detected accurately by acquiring a complete outline of the capsule seam, so that various types of the splitting-in-insertion defects of the capsule can be detected as much as possible, thereby reducing the possibility of missed detection.

In a first aspect of the present disclosure, a method for acquiring a capsule seam image is provided. A capsule cap and a capsule body of a capsule have a same color at an insertion position between the capsule cap and the capsule body. The method includes: acquiring a first image component, where the first image component includes an image component a capsule seam in a preset channel, in the first image component, the image component of the capsule seam in the preset channel has step change; performing a highlighting process on the first image component according to an insertion direction from the capsule cap to the capsule body to obtain a second image component, where the second image component at least includes an enhanced capsule seam feature; and performing noise reduction and compensation on the second image component to obtain a target image component, where the target image component includes a complete outline of the capsule seam.

In an embodiment of the present disclosure, the preset channel includes a brightness channel, before acquiring the first image component, the method further includes: acquiring a to-be-detected capsule image; acquiring a first image from the to-be-detected capsule image according to a preset rule, where the first image includes an image of the capsule seam, and the preset rule is determined based on capsule parameters with multiple specifications and a preset detection redundancy quantity; and converting the first image to a preset color model to obtain the first image component.

In an embodiment of the present disclosure, the capsule parameters include capsule total lengths with multiple specifications, capsule cap lengths with multiple specifications and capsule body lengths with multiple specifications; and the preset detection redundancy quantity includes a proportion of the capsule seam in the whole capsule and an image acquisition redundant angle.

In an embodiment of the present disclosure, the performing a highlighting process on the first image component according to an insertion direction from the capsule cap to the capsule body to obtain a second image component includes: taking a derivative of the first image component according to the insertion direction from the capsule cap to the capsule body, and taking an absolute value of the derivative to obtain the second image component.

In an embodiment of the present disclosure, matrix calculation is performed between a Sobel operator and the first image component to simulate and approximate an operation of taking the derivative of the first image component according to the insertion direction from the capsule cap to the capsule body, to obtain the second image component that is approximate to the derivative.

In an embodiment of the present disclosure, the noise reduction and compensation performed on the second image component includes at least one of an adaptive thresholding process, a global thresholding process, a filtering process and a morphological process.

In an embodiment of the present disclosure, the performing noise reduction and compensation on the second image component to obtain a target image component includes: performing the adaptive thresholding process and the global thresholding process on the second image component respectively, and taking an intersection between a result of the adaptive thresholding process and a result of the global thresholding process to obtain a candidate target image component; and performing at least one of the filtering process and the morphological process on the candidate target image component to obtain the target image component, where the morphological process at least includes a morphological closing operation.

In a second aspect of the present disclosure, an apparatus for acquiring a capsule seam image is provided. A capsule cap and a capsule body of a capsule have a same color at an insertion position between the capsule cap and the capsule body. The apparatus includes: an acquiring module, configured to acquire a first image component, where the first image component includes an image component of a capsule seam in a preset channel; in the first image component, the image component of the capsule seam in the preset channel has step change; and a processing module, configured to: perform a highlighting process on the first image component according to an insertion direction from the capsule cap to the capsule body to obtain a second image component, where the second image component at least includes an enhanced capsule seam feature; and perform noise reduction and compensation on the second image component to obtain a target image component, where the target image component includes a complete outline of the capsule seam.

In a third aspect of the present disclosure, a computer-readable storage medium including instructions is provided. The instructions, when being executed on a computer, cause the computer to perform the method described in the first aspect.

In a fourth aspect of the present disclosure, a computing device is provided. The computing device includes a memory, a processor, and computer programs which are stored on the memory and operable on the processor. The processor, when executing the computer programs, performs the method described in the first aspect.

The method for acquiring a capsule seam image, the apparatus for acquiring a capsule seam image, the storage medium and the computing device according to the embodiments of the present disclosure may be applied to defect detection of the capsule with the capsule cap and the capsule body having the same color. Firstly, a first image component is acquired. The first image component includes an image component of a capsule seam in a preset channel. In the first image component, the image component of the capsule seam in the preset channel has step change. Secondly, the highlighting process is performed on the first image component according to an insertion direction from the capsule cap to the capsule body to obtain a second image component. The second image component at least includes an enhanced capsule seam feature. Then noise reduction and compensation is performed on the second image component to obtain a target image component. The target image component includes a complete outline of the capsule seam. Finally, defect detection is performed on the capsule based on the target image component. In the present disclosure, by acquiring the image component with step change of the capsule seam, the problems of the low contrast and the unobvious feature of the capsule seam can be better overcome, then the complete outline of the capsule seam can be more accurately obtained, and it is possible to more accurately detect, based on the complete outline, whether there is the splitting-in-insertion defect at the capsule seam, thereby reducing a missed detection rate.

BRIEF DESCRIPTION OF THE DRAWINGS

The above and other objects, features and advantages of the exemplary embodiments of the present disclosure will become readily understood by reading the following detailed description with reference to the accompanying drawings. In the accompanying drawings, several embodiments of the present disclosure are shown by way of illustration and not limitation.

In the drawings, same or corresponding reference numerals denote same or corresponding parts.

DETAILED DESCRIPTION OF THE EMBODIMENTS

Figures 1, 2:
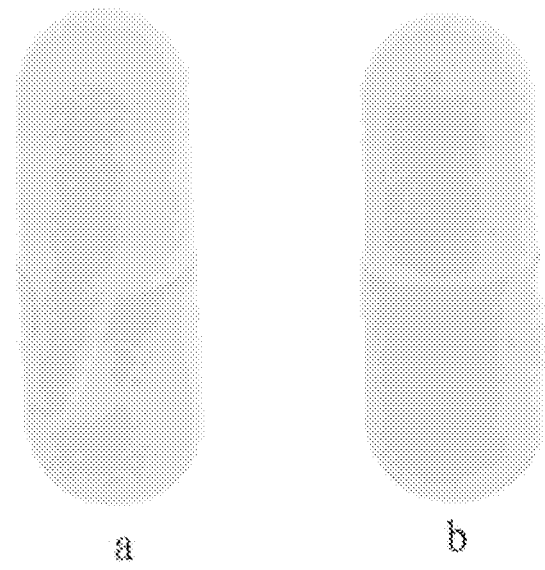
FIG. 1 is a schematic diagram of original images of a capsule with the splitting-in-insertion defect and a normal capsule acquired by an image acquisition device from a to-be-detected capsule.
FIG. 2 is a diagram of a communication system implementing a method for acquiring a capsule seam image according to an embodiment of the present disclosure.

The principle and spirit of the present disclosure will be described below with reference to several exemplary embodiments. It should be understood that these embodiments are given only to enable those skilled in the art to better understand and implement the present disclosure, but not to limit the scope of the present disclosure in any way. Rather, these embodiments are provided so that the present disclosure will be thorough and complete, and the scope of the present disclosure may be fully conveyed to those skilled in the art.

Those skilled in the art know that the embodiments of the present disclosure may be implemented as a system, an apparatus, a device, a method or a computer program product. Therefore, the present disclosure may be specifically implemented in the following forms: complete hardware, complete software (including firmware, resident software, microcode, etc.), or a combination of hardware and software.

Embodiments of the present disclosure provide a method for acquiring a capsule seam image, an apparatus for acquiring a capsule seam image, a storage medium and a computing device, which may be applied to a capsule detection system. The capsule detection system may include an image acquisition apparatus and an apparatus for acquiring a capsule seam image. The image acquisition apparatus and the apparatus for acquiring a capsule seam image may be integrated or deployed separately. The image acquisition apparatus is at least used for image acquisition based on a to-be-detected capsule to obtain a to-be-detected capsule image. The apparatus for acquiring a capsule seam image is used for processing the to-be-detected capsule image, to obtain a complete outline of a capsule seam. The image acquisition apparatus may be an image acquisition device, such as a camera or a scanner. The apparatus for acquiring a capsule seam image may be an image processing program for processing the to-be-detected capsule image, to obtain the complete outline of the capsule seam. The apparatus for acquiring a capsule seam image may also be a terminal device or a server deployed with the image processing program.

In addition, any number of elements in the drawings is used for illustration rather than limitation, and any designation is only for distinction and does not have any limiting meaning.

The principle and spirit of the present disclosure will be explained in detail below with reference to several representative embodiments of the present disclosure.

SUMMARY OF THE INVENTION

The inventors found that if the capsule has a splitting-in-insertion defect, the outline of the seam, formed after the capsule cap and the capsule body are inserted with each other, is different from the outline of a normal capsule. Referring to FIG. 1, the capsule shown in a of FIG. 1 has a splitting-in-insertion defect, and the outline of the seam has a missed part, which is different from the outline of the normal capsule. The capsule shown in b of FIG. 1 has no defect. However, because the capsule cap and the capsule body of a single color capsule have the same color at an insertion position, it is difficult to accurately obtain the outline of the capsule seam, so that it is impossible to accurately detect the splitting-in-insertion defect of the capsule. Referring to FIG. 1, in the capsule image directly acquired by the image acquisition device, the seam formed by the insertion between the capsule cap and the capsule body is difficult to identify, that is, the contrast of the capsule seam in the capsule image is not high and the feature of the capsule seam is not obvious. It is considered that, any color image is composed of many pixels, and each pixel is composed of a combination of colors, more precisely, primary colors. In addition, the capsule cap and the capsule body have a same color at the insertion position, however, the capsule cap and the capsule body are not integrally formed, there is an intersection in space between the capsule cap and the capsule body, that is, the image of capsule seam must have a different representation from the image of the surrounding part.

Therefore, the inventors analyzed the capsule image in various color spaces and color models, and found that the capsule image component of the capsule seam in some channels has step change, that is, the image component of the capsule seam may appear different from the image component of the surrounding part. Therefore, in the present disclosure, the complete outline of the capsule seam is obtained according to the capsule image component having step change at the capsule seam, and then defect detection is performed based on the complete outline of the capsule seam.

After introducing the basic principles of the present disclosure, various non-limiting embodiments of the present disclosure are introduced in detail below.

Overview of Application Scenarios

In some implementations, the image acquisition apparatus and the apparatus for acquiring a capsule seam image are deployed separately. Referring to FIG. 2, the method for acquiring a capsule seam image provided in the embodiment of the present disclosure may be implemented based on a communication system shown in FIG. 2. The communication system may include an image acquisition device 101 and a server 102.

The image acquisition device 101 may be a camera, which may acquire a to-be-detected capsule image.

The server 102 may be an apparatus for acquiring a capsule seam image, in which an image processing program may be deployed.

The server 102 may receive the to-be-detected capsule image from the image acquisition device 101, and then process the to-be-detected capsule image to obtain the complete outline of the capsule seam.

It should be noted that the server involved in the embodiment of the present disclosure may be an independent physical server, or a server cluster or distributed system composed of multiple physical servers, or a cloud server that provides basic cloud computing services such as cloud services, cloud databases, cloud computing, and cloud functions, cloud storage, network services, cloud communications, middleware services, domain name services, security services, CDN, and big data and artificial intelligence platforms.

The terminal device involved in the embodiment of the present disclosure may be a device that provides voice and/or data connectivity to users, a handheld device with a wireless connection function, or other processing devices connected to a wireless modem. For example, the terminal device may be mobile telephones (or called as "cellular" telephones) and computers with mobile terminals, such as portable, pocket, hand-held, built-in computer, or vehicle-mounted mobile devices, that exchange voice and/or data with the wireless access network. For example, the terminal device may be Personal Communication Service (PCS) telephones, cordless telephones, Session Initiation Protocol (SIP) telephones, Wireless Local Loop (WLL) stations, Personal Digital Assistants (PDA) and other equipment.

Exemplary Method

The method for acquiring a capsule seam image according to an exemplary embodiment of the present disclosure may be described below with reference to FIG. 3 in conjunction with the application scenario shown in FIG. 2. It should be noted that the above application scenario is only shown for the convenience of understanding the spirit and principle of the present disclosure, and the embodiments of the present disclosure are not limited in this regard. On the contrary, the embodiments of the present disclosure can be applied to any applicable scenario.

Figure 3:
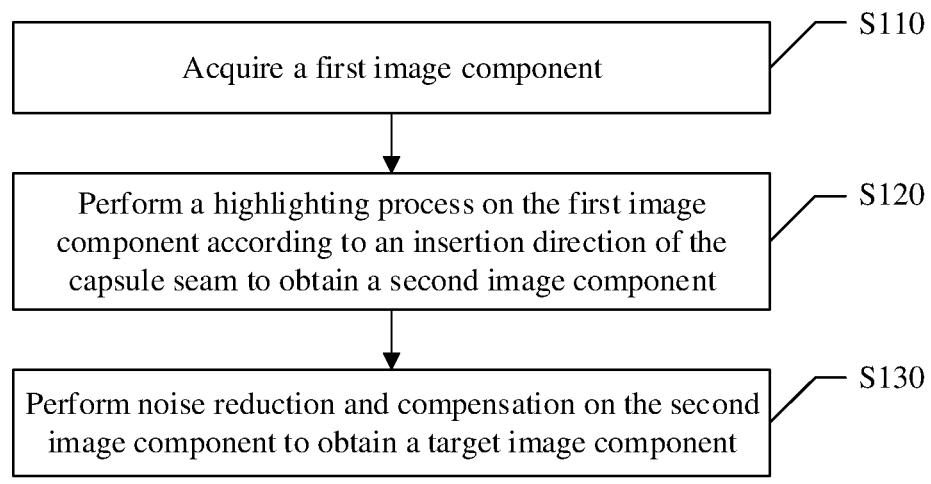
FIG. 3 is a schematic flowchart of a method for acquiring a capsule seam image according to an embodiment of the present disclosure.

Referring to FIG. 3, FIG. 3 is a schematic flowchart of a method for acquiring a capsule seam image according to an embodiment of the present disclosure. The method may be executed by the apparatus for acquiring a capsule seam image to process the to-be-detected capsule image, to obtain the complete outline of the capsule seam, where the capsule cap and the capsule body have the same color at the insertion position. The method for acquiring a capsule seam image includes steps S110 to S130.

Step S110, acquire a first image component.

The first image component includes an image component of a capsule seam in a preset channel. According to the description of the technical principle of the present disclosure in the summary of the invention, the purpose of the present disclosure is to explore the difference in image representation between the capsule seam and the surrounding parts, so as to fully extract the complete outline of the capsule seam for defect detection of the capsule.

In one embodiment of the present disclosure, after the to-be-detected capsule image (the original image acquired by the image acquisition apparatus) is acquired, the to-be-detected capsule image may be converted into different color spaces, and then representation of the to-be-detected capsule image in each color space may be analyzed respectively. Specifically, the color space may include RGB color space, XYZ color space, Lab color space and Hue, Saturation, Value (HSV) color space.

It is considered that the embodiment of the present disclosure intends to detect whether there is a splitting-in-insertion defect at the capsule seam (i.e., the insertion position between the capsule cap and the capsule body of the capsule) of the single color capsule (that is, the capsule cap and the capsule body of the capsule have the same color at the insertion position), and the representations of different parts of the single color capsule in many channels generally tend to be consistent, it is therefore difficult to distinguish the capsule seam from the surrounding parts. In addition, although the capsule cap and the capsule body have the same color at the insertion position, the capsule cap and the capsule body are not integrally formed, there is an intersection in space between the capsule cap and the capsule body, that is, the image of capsule seam must have a different representation from the image of the surrounding part. For example, a shadow exists in the image of capsule seam. Therefore, the image component of the capsule seam in the brightness channel may have a different representation from the surrounding parts.

Figure 4:
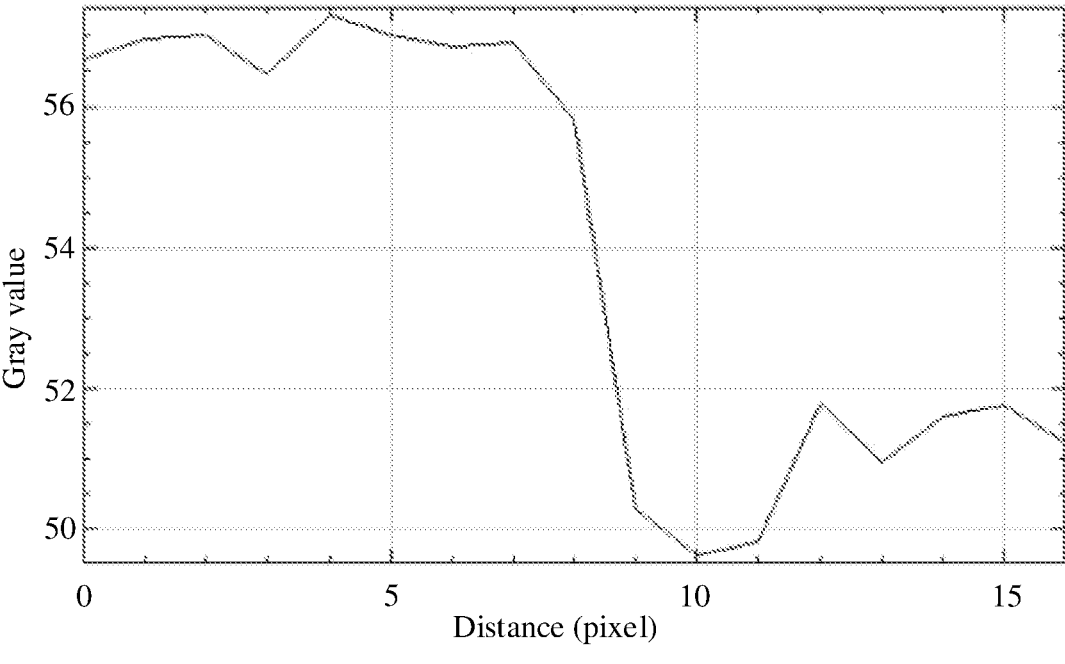
FIG. 4 is a schematic diagram of gray value change of a to-be-detected capsule image in a brightness channel according to an embodiment of the present disclosure.

Referring to FIG. 4, FIG. 4 is a schematic diagram of gray value change of the to-be-detected capsule image in the brightness channel. The abscissa indicates the distance, which represents the change from the top of the capsule to the bottom of the capsule in a vertical state of the capsule (as shown in FIG. 1). The ordinate indicates the gray value, which represents the gray value change of the to-be-detected capsule image in the brightness channel from the top of the capsule to the bottom of the capsule. It can be seen that in FIG. 4, the gray value of the middle space, having a 5-10 pixel distance from the top of the capsule, has a step change. According to the overall shape of the capsule, the middle space, having a 5-10 pixel distance from the top of the capsule, is the capsule seam, that is, the image component of the capsule seam in the brightness channel has step change.

Therefore, in an embodiment of the present disclosure, the preset channel may be the brightness channel, and acquiring the first image component may be acquiring an image component of the to-be-detected capsule image in the brightness channel.

Figure 5:
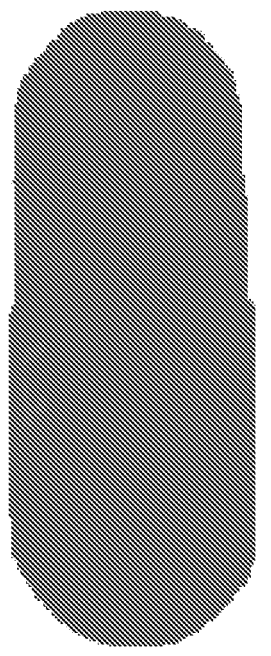
FIG. 5 is a schematic diagram of a first image component including a complete capsule according to an embodiment of the present disclosure.

In one embodiment of the present disclosure, the to-be-detected capsule image may be directly converted to the HSV color space, and then the image component of the to-be-detected capsule image in the brightness channel V may be acquired, that is, the first image component may be acquired. Referring to FIG. 5, the acquired first image component represents a complete to-be-detected capsule.

It is considered that the to-be-detected capsule image is a complete image of one side of the to-be-detected capsule, which refers to a complete capsule image collected from a visual angle similar to the front view, left view, right view or rear view. However, when actually performing defect detection, the defect detection only needs to be performed based on the images of the capsule seams, and the images of other parts do not need to be processed. Therefore, in order to save computing resources and time, the image of the capsule seam may be obtained from the to-be-detected capsule image, and only the image of the capsule seam is processed. In one embodiment of the present disclosure, before acquiring the first image component, the method further includes: acquiring a to-be-detected capsule image; acquiring a first image from the to-be-detected capsule image according to a preset rule, where the first image includes an image of the capsule seam, and the preset rule is determined based on capsule parameters with multiple specifications and a preset detection redundancy quantity; and converting the first image to a preset color model to obtain the first image component.

In the embodiment of the present disclosure, the preset rule may be determined based on the capsule parameters with multiple specifications and the preset detection redundancy quantity. The capsule parameters include capsule total lengths with multiple specifications, capsule cap lengths with multiple specifications and capsule body lengths with multiple specifications. The preset detection redundancy quantity includes a proportion of the capsule seam in the whole capsule and an image acquisition redundant angle. Specifically, sizes of the capsule body and the capsule cap of each type of capsule are fixed. That is to say, a seam position corresponding to each type of capsule is also relatively fixed. Therefore, an approximate position of the capsule seam may be determined according to the standard specification, to obtain the first image. The specifications of each type of capsule are shown in Table 1.

may be reserved to ensure that all positions of the capsule are detected, that is, an area of an angle range of 120° is processed in each detection. A ratio of the width of the 120° area, projected onto the plane, to the total width of the capsule is:

$$\alpha = \frac{r \cdot \sin 60 \cdot 2}{2r} \approx 0.866.$$

That is, the to-be-detected capsule image acquired each time is roughly 0.866 times of the image obtained by spreading the complete capsule along the axis. One-tenth of the middle position in the vertical direction of the to-be-detected capsule image may be acquired as the image of the capsule seam.

Figure 6:
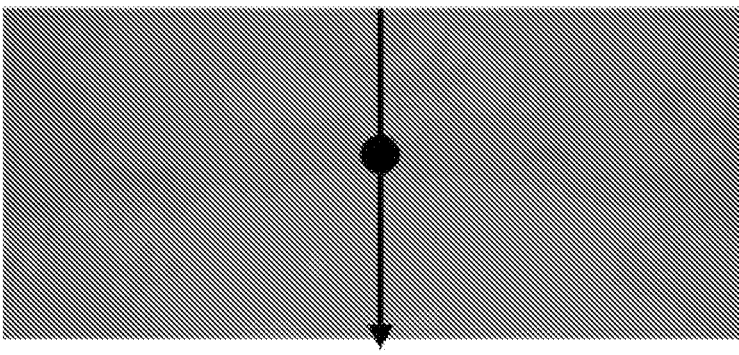
FIG. 6 is a schematic diagram of a first image component including only a capsule seam according to an embodiment of the present disclosure.

The first image is acquired from the to-be-detected capsule image according to the preset rule, to obtain the image of the capsule seam in the to-be-detected capsule image, such as the image of the capsule seam in the to-be-detected capsule image shown in FIG. 1. Then the first image component is acquired based on the image of the capsule seam (that is, the first image is converted to a preset HSV color space, and then the image component in the brightness V channel is acquired as the first image component). The first image component only includes the image component of the capsule seam in the preset channel, which is shown in FIG. 6.

It may be understood that, in one embodiment of the present disclosure, the image component of the complete capsule in the preset channel may be acquired based on the to-be-detected capsule image firstly, then the first image component including only the capsule seam may be acquired.

In step S120, a highlighting process is performed on the first image component according to an insertion direction from the capsule cap to the capsule body to obtain a second image component, where the second image component at least includes an enhanced capsule seam feature.

Figure 7:
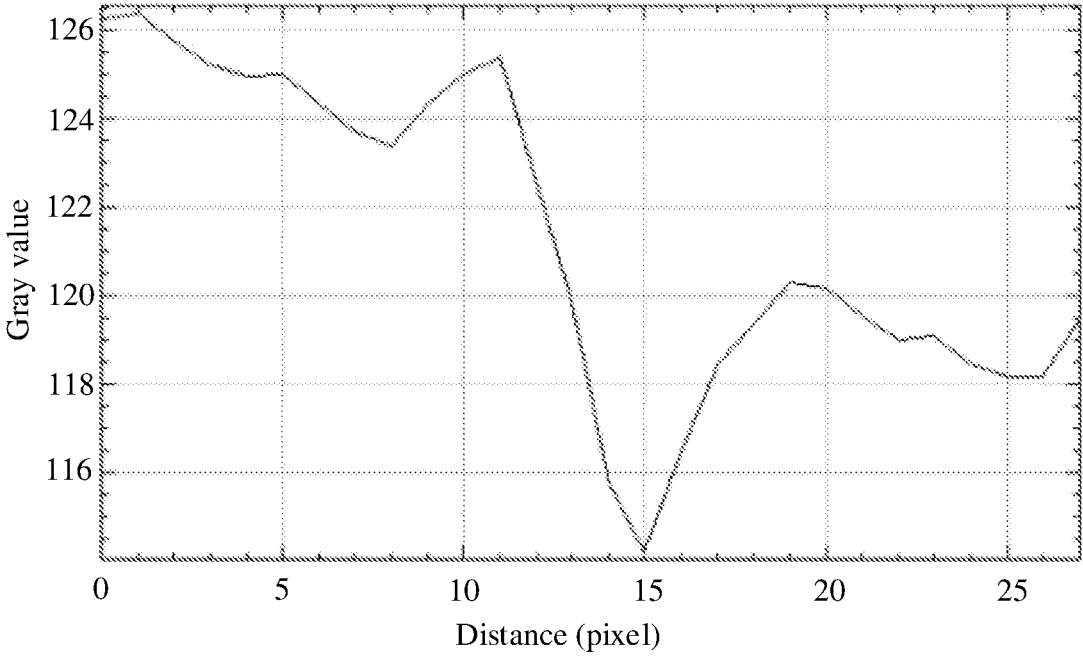
FIG. 7 is a schematic diagram of gray value change in FIG. 6.

In the embodiment of the present disclosure, the first image component including only the capsule seam may be further analyzed. Referring to FIG. 7, FIG. 7 shows gray value change of the image component of the capsule seam in the brightness channel along the Y axis (the vertical downward direction of the capsule is taken as the positive direction). The position with the abscissa of 15 in the drawing corresponds to the middlemost position of the capsule seam (the black dot in FIG. 6). It can be seen from

TABLE 1

| Product specification | | 00 | 0 | 1 | 2 | 3 |
|---|---|---|---|---|---|---|
| Length (mm) | Capsule cap | 11.73 ± 0.50 | 11.00 ± 0.40 | 9.8 ± 0.40 | 9.0 ± 0.40 | 8.10 ± 0.40 |
| | Capsule body | 20.22 ± 0.50 | 8.75 ± 0.25 | 16.70 ± 0.25 | 15.30 ± 0.30 | 13.60 ± 0.40 |
| | Capsule total length (mm) | 23.3 ± 0.30 | 21.2 ± 0.30 | 19.0 ± 0.30 | 17.5 ± 0.30 | 15.5 ± 0.30 |

According to the parameters in Table 1, the seam position of the capsule with each specification may be estimated in an embodiment of the present disclosure. Generally, the height of the seam position accounts for about one-tenth of the total height of the capsule, and the range of the seam position in Y direction fluctuates within 0.4-0.6. It is considered that the capsule is shot multiple times from different angles, taking four shots as an example, that is, an area of an angle range of 360°/4=90° is processed in each shot. A margin of 30°

FIG. 7 that the grayscale curve has certain features. Firstly, there is a local minimum in the grayscale curve, i.e., the trough position corresponding to the center of the seam. Secondly, before reaching the local minimum, a change rate of the grayscale curve is relatively large, in other words, the derivative is relatively large.

Therefore, in an embodiment of the present disclosure, in order to extract the outline of the capsule seam more completely, accurately and efficiently, a derivative of the image may be taken to highlight the feature of the seam position. Specifically, in one embodiment of the present disclosure, the derivative of the image may be taken only along the Y-axis direction (the insertion direction from the capsule cap to the capsule body). It should be noted that, the derivative of the image may be a negative number. For the convenience of the machine vision observation, an absolute value of the derivative is taken in this embodiment. That is, in this embodiment, a derivative of the first image component is taken according to the insertion direction from the capsule cap to the capsule body, and an absolute value of the derivative is taken to obtain the second image component.

It may be understood that, in the embodiment of the present disclosure, the derivative of the image is taken according to the insertion direction from the capsule cap to the capsule body to highlight the first image component. However, the present disclosure is not limited thereto. For example, the derivative of the image may be taken according to the insertion direction from the capsule body to the capsule cap. The essence of the present disclosure is to take the derivative of the image along a direction from the capsule cap to the capsule body (i.e., the vertical direction of the capsule), to find and extrude the feature of the position (seam) having step change in the image component of the complete capsule.

It is considered that in the traditional sense, it is difficult to take the derivative of the image itself, which is actually a matrix and a discrete signal. In one embodiment of the present disclosure, a Sobel operator is used to obtain an approximate result. Specifically, matrix calculation is performed between the Sobel operator and the first image component to simulate and approximate an operation of taking the derivative of the first image component according to the insertion direction from the capsule cap to the capsule body, to obtain the second image component that is approximate to the derivative.

Figure 8:
FIG. 8 is a schematic diagram of an image obtained by performing a highlighting process on the image in FIG. 6.

A specific result is shown in FIG. 8, it can be seen from FIG. 8 that the seam area is highlighted. The brighter band in the center of the image is the enhanced feature representation of the capsule seam, that is, the enhanced capsule seam feature.

It is considered that when the feature of the capsule seam is enhanced, at the same time the noise is also enhanced accordingly. It can be seen from FIG. 8 that, the capsule seam seems to be more obvious, but the overall image also becomes noisier, which may affect the robustness of the algorithm to a certain extent. In order to solve this problem, step S130 is performed in the embodiment of the present disclosure to perform noise reduction and compensation on the second image component to obtain a target image component. The target image component includes a complete outline of the capsule seam.

Specifically, the noise reduction and compensation performed on the second image component includes at least one of an adaptive thresholding process, a global thresholding process, a filtering process and a morphological process.

In an embodiment of the present disclosure, the performing noise reduction and compensation on the second image component to obtain a target image component includes: performing the adaptive thresholding process and the global thresholding process on the second image component respectively, and taking an intersection between a result of the adaptive thresholding process and a result of the global thresholding process to obtain a candidate target image component. That is, in the embodiment of the present disclosure, two different ways of thresholding are used, and the results of two different ways of thresholding are fused to further enhance the feature of the capsule seam.

(1) Adaptive Thresholding Process

The adaptive thresholding process is also known as moving average based variable thresholding process, by which lighting bias can be reduced. The adaptive thresholding process is performed line by line in a zigzag mode. When Z k+1 represents the gray value of the point met in the scan sequence of step k+1, the moving average of Z k+1 at the new point is:

$$m(k+1) = \begin{cases} \dfrac{1}{n}\sum\limits_{i=k+2-n}^{k+1} z_i, & k \geq n-1 \\ m(k) + \dfrac{1}{n}(z_{k+1} - z_{k-n}), & k \geq n+1 \end{cases}.$$

Figure 9:
FIG. 9 is a schematic diagram of an image obtained by performing an adaptive thresholding process on the image in FIG. 8.

In the formula, n is the number of points used to calculate the average, $m(1) = Z_i$. In the embodiment of the present disclosure, a local thresholding process is performed on the moving average to obtain the image shown in FIG. 9.

In the embodiment of the present disclosure, the image obtained by no performing the thresholding process may be referred to as $f(x, y)$. The image obtained by performing the adaptive thresholding process on $f(x, y)$ may be recorded as $f_1(x, y)$.

Global Thresholding Process

It can be seen from the calculation formula of the moving average that, the calculation process is a completely automatic process, and the result is calculated automatically, and it may not be possible to perform refined and targeted processing for various specific scenarios. In order to ensure the controllability of the processing, an empirical control factor is also added in an embodiment of the present disclosure, that is, the global thresholding process is performed. A threshold T for the segmentation mode is set for the to-be-detected capsule image $f(x,y)$, the processed image $f_2(x, y)$ is:

$$f_2(x, y) = \begin{cases} 1, & f(x, y) > T \\ 0, & f(x, y) \leq T \end{cases}.$$

Figure 10:
FIG. 10 is a schematic diagram of an image obtained by performing a global thresholding process on the image in FIG. 8.

When T is a constant suitable for the entire image, the process given in the above formula is called as global thresholding process. A reasonable T is determined through experience, and the image result obtained in the embodiment of the present disclosure is shown in FIG. 10.

(3) Result Fusion

In the embodiment of the present disclosure, two kinds of thresholding processes are used, to obtain respectively the adaptive thresholding result obtained by automatic calculation of moving average and the global thresholding result controlled by the global threshold. An intersection between the adaptive thresholding result and the global thresholding result is taken to fuse the two results, to achieve an effect of mutual restraint between the two results. This operation may be implemented as a bitwise AND operation, namely:

$$g(x,y) = f_1(x,y) \cap f_2(x,y).$$

Figure 11:
FIG. 11 is a schematic diagram of an image obtained by fusing the image in FIG. 9 and the image in FIG. 10.

The candidate target image component is obtained by the fusion, and the fusion result is shown in FIG. 11.

It can be seen that there is still some salt and pepper noises in the fusion result (the noise superimposed on the image in the form of white or black spots is called as salt and pepper noise). Therefore, in an embodiment of the present disclosure, an appropriate filter may be selected for further filtering it. That is, in an embodiment of the present disclosure, the filtering process is performed on the candidate target image component.

After comparison, it is found that the median filter is especially effective for the salt and pepper noise.

The median filter is a statistical sorting filter that sorts all pixel values in a neighborhood of the image, and the median value of the sorted sequence is taken as the output of the filter. In a case that there are many same values in the neighborhood, the same values are often grouped together and taken as the median value. A main function of the median filter is to force each point to be more like its neighbors. The m×m median filter forces a value of an isolated pixel that is brighter or darker than its neighbors to be the median value of the pixel gray values in the neighborhood. The result obtained by applying the median filter multiple times is shown in FIG. 12.

Figure 12:
FIG. 12 is a schematic diagram of an image obtained by performing a filtering process on the image in FIG. 11.

It can be seen from FIG. 12 that, the result of the filtering process performed by the median filter has tended to be perfect, but this perfection may be limited to most cases. When the feature of the capsule seam is very unobvious, the filtering process performed by the median filter may destroy the skeleton of the seam and decompose the seam into multiple small segments, as shown in FIG. 13.

Figure 13:
FIG. 13 is a schematic diagram of an image having segments obtained by performing the filtering process on the image in FIG. 11.

The situation shown in FIG. 13 may have an adverse effect on the extraction of the complete outline of the capsule seam. It is considered that the capsule seam itself may not be multiple small segments as shown in FIG. 13, i.e. it is not inherently so, therefore it may be concluded that the multiple small segments are caused by algorithm calculation. Because such a small mutation does not exist in nature, it is impossible that the seam does not exist within tens of microns and then the seam suddenly appears.

To compensate for the situation shown in FIG. 13, in one embodiment of the present disclosure, a morphological process is further performed on the candidate target image component to obtain the target image component. The morphological process is performed after the filtering process. The morphological process at least includes a morphological closing operation.

There are many kinds of morphological operations, including dilation, erosion, opening operation, closing operation and so on. The closing operation can smooth the outline, bridge narrow breaks and slender gullies, eliminate small holes, and fill gaps in the outline. The closing operation performed by a structure element B on a set A (expressed as A·B) is defined as:

$$A \cdot B = (A \oplus B) \ominus B.$$

According to the above formula, the closing operation performed by the structure element B on the set A is: first, B expands A, and then B corrodes the expansion result. It can be proved that if the opening operation or the closing operation is performed on a set multiple times, the operation result may not change.

Therefore, in an embodiment of the present disclosure, a suitable structure element B may be constructed. For example, it is considered that the overall shape of the capsule seam is a long strip shape, a rectangular structure element B may be constructed in the embodiment of the present disclosure, to more efficiently perform the closing operation on the result in FIG. 13, to obtain the target image component shown in FIG. 14.

It can be understood that although the structure element B is constructed by taking a rectangular structural element as an example in the embodiment of the present disclosure, the structure element is not limited thereto, and those skilled in the art may also construct a circular structure element or a cross-shaped structure element.

Figure 14:
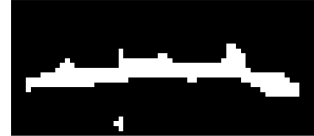
FIG. 14 is a schematic diagram of an image obtained by performing a morphological closing operation on the image in FIG. 12.

It can be seen from the feature of the capsule seam shown in FIG. 14 that, the complete outline of the capsule seam is clear and accurate, and can be completely extracted.

After obtaining the target image component including the complete outline of the capsule seam, outline, area, size and other information of the complete outline of the capsule seam may be analyzed, so as to further detect possible defects.

In the present disclosure, by acquiring the image component with step change of the capsule seam, the problems of the low contrast and the unobvious feature of the capsule seam can be better overcome, then the complete outline of the capsule seam can be more accurately obtained, and it is possible to more accurately detect, based on the complete outline, whether there is the splitting-in-insertion defect at the capsule seam, thereby reducing a missed detection rate.

Exemplary Apparatus

Figure 15:
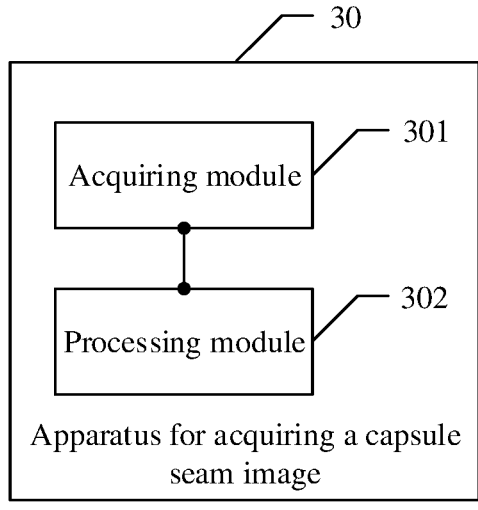
FIG. 15 is a schematic structural diagram of an apparatus for acquiring a capsule seam image according to an embodiment of the present disclosure.

After introducing the method according to the exemplary embodiments of the present disclosure, next, referring to FIG. 15, an apparatus for acquiring a capsule seam image according to the exemplary embodiments of the present disclosure is described. A capsule cap and a capsule body of a capsule have a same color at an insertion position between the capsule cap and the capsule body. The apparatus 30 includes an acquiring module 301 and a processing module 302.

The acquiring module 301 is configured to acquire a first image component, where the first image component includes an image component of a capsule seam in a preset channel. The capsule cap and the capsule body of the capsule have a same color at the insertion position.

The processing module 302 is configured to: perform a highlighting process on the first image component according to an insertion direction from the capsule cap to the capsule body to obtain a second image component, where the second image component at least includes an enhanced capsule seam feature; and perform noise reduction and compensation on the second image component to obtain a target image component, where the target image component includes a complete outline of the capsule seam.

In one embodiment of the present disclosure, the preset channel includes the brightness channel, the acquiring module 301 is further configured to: acquire a to-be-detected capsule image; acquire a first image from the to-be-detected capsule image according to a preset rule, where the first image includes an image of the capsule seam, and the preset rule is determined based on capsule parameters with multiple specifications and a preset detection redundancy quantity; and convert the first image to a preset color model to obtain the first image component.

In one embodiment of the present disclosure, the capsule parameter includes capsule total lengths with multiple specifications, capsule cap lengths with multiple specifications and capsule body lengths with multiple specifications; and the preset detection redundancy quantity includes a proportion of the capsule seam in the whole capsule and an image acquisition redundant angle.

In one embodiment of the present disclosure, the processing module 302 is configured to: take a derivative of the first image component according to the insertion direction from the capsule cap to the capsule body, and take an absolute value of the derivative to obtain the second image component.

In one embodiment of the present disclosure, matrix calculation is performed between a Sobel operator and the first image component to simulate and approximate an operation of taking the derivative of the first image component according to the insertion direction from the capsule cap to the capsule body, to obtain the second image component that is approximate to the derivative.

In one embodiment of the present disclosure, the noise reduction and compensation performed on the second image component includes at least one of an adaptive thresholding process, a global thresholding process, a filtering process and a morphological process.

In one embodiment of the present disclosure, the processing module 302 is configured to: perform the adaptive thresholding process and the global thresholding process on the second image component, and take an intersection between a result of the adaptive thresholding process and a result of the global thresholding process to obtain a candidate target image component; and perform at least one of the filtering process and the morphological process on the candidate target image component to obtain the target image component, where the morphological process at least includes a morphological closing operation.

In the present disclosure, the problems of the low contrast and the unobvious feature of the capsule seam can be better overcome by acquiring the image component with step change of the capsule seam, then the complete outline of the capsule seam can be more accurately obtained, and it is possible to more accurately detect, based on the complete outline, whether there is the splitting-in-insertion defect at the capsule seam, thereby reducing a missed detection rate.

Exemplary Medium

Figure 16:
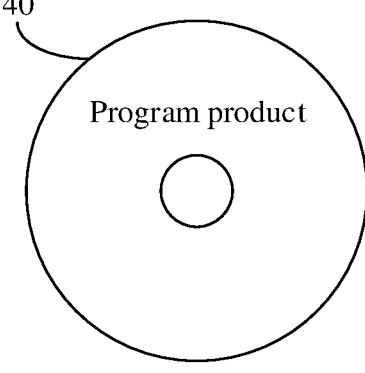
FIG. 16 is a schematic diagram of a storage medium according to an embodiment of the present disclosure.

After introducing the method and apparatus according to the exemplary embodiments of the present disclosure, the computer-readable storage medium according to the exemplary embodiments of the present disclosure will be described with reference to FIG. 16. The computer-readable storage medium shown in FIG. 16 is an optical disc 40, which stores a computer program (that is, a program product). The computer program, when executed by a processor, performs the steps described in the above method embodiments. For example, the steps include: acquiring a first image component, where the first image component includes an image component of a capsule seam in a preset channel; in the first image component, the image component of the capsule seam in the preset channel has step change; performing a highlighting process on the first image component according to an insertion direction from the capsule cap to the capsule body to obtain a second image component, where the second image component at least includes an enhanced capsule seam feature; and performing noise reduction and compensation on the second image component to obtain a target image component, where the target image component includes a complete outline of the capsule seam. The specific implementation manner of each step is not repeated here.

It should be noted that examples of the computer-readable storage medium may also include, but are not limited to, phase change memory (PRAM), static random access memory (SRAM), dynamic random access memory (DRAM), other types of random access memory (RAM), read only memory (ROM), electrically erasable programmable read only memory (EEPROM), flash memory or other optical and magnetic storage media, which are not described here.

Exemplary Computing Device

Figure 17:
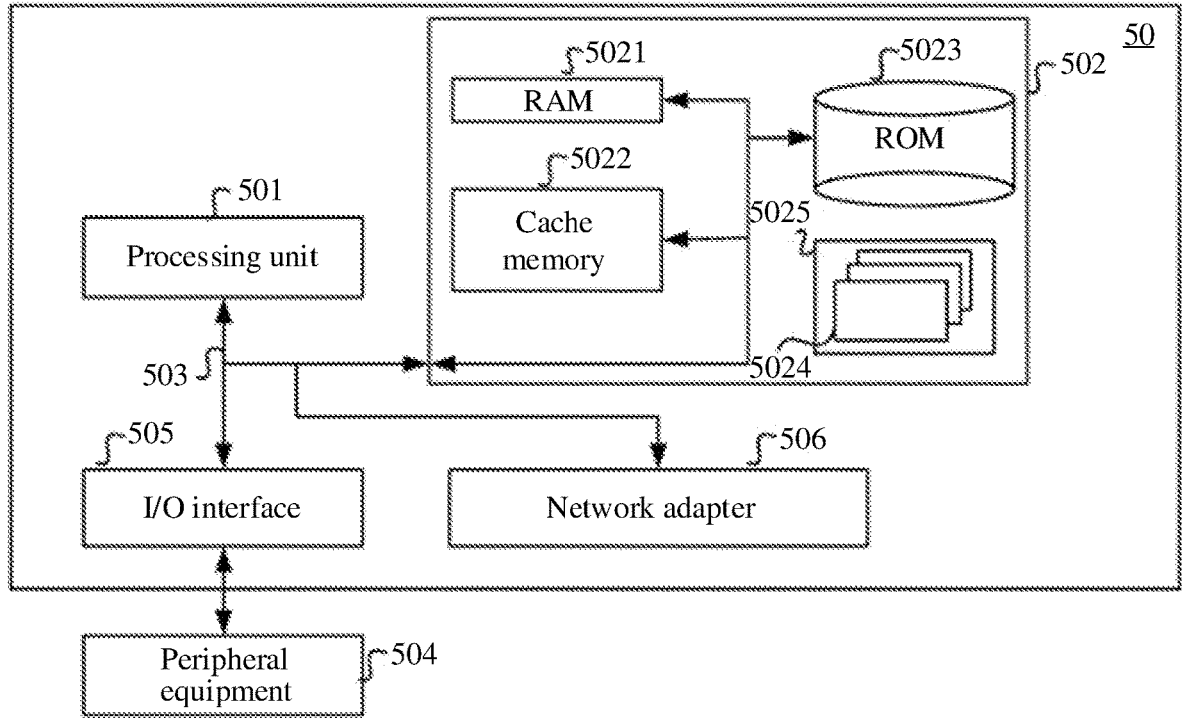
FIG. 17 is a schematic structural diagram of a computing device according to an embodiment of the present disclosure.

After introducing the method, medium, and apparatus according to the exemplary embodiments of the present disclosure, referring to FIG. 17, a computing device for acquiring a capsule seam image according to the exemplary embodiments of the present disclosure is described.

FIG. 17 shows a block diagram of an exemplary computing device 50 suitable for implementing embodiments of the present disclosure. The computing device 50 may be a computer system or a server. The computing device 50 shown in FIG. 17 is only an example, and should not limit the functions and use scope of the embodiments of the present disclosure.

As shown in FIG. 17, the components of the computing device 50 may include, but are not limited to: one or more processors or processing units 501, a system memory 502, and a bus 503 connecting different system components (including the system memory 502 and the processing unit 501).

The computing device 50 typically includes a variety of computer system readable media. These media may be any available media that can be accessed by the computing device and include both volatile and nonvolatile media, removable and non-removable media.

The system memory 502 may include computer system readable media in the form of volatile memory, such as random access memory (RAM) 5021 and/or cache memory 5022. The computing device 50 may further include other removable/non-removable, volatile/nonvolatile computer system storage media. By way of example only, the ROM 5023 may be used to read and write to non-removable, non-volatile magnetic media (not shown in FIG. 17, commonly referred to as a "hard drive"). Although not shown in FIG. 17, a disk drive can be provided for reading and writing to removable nonvolatile disks (such as "floppy disks"), and an optical drive for reading and writing to removable nonvolatile optical disks (such as CD-ROM, DVD-ROM, or other optical media). In these cases, each drive may be connected to the bus 503 through one or more data medium interfaces. The system memory 502 may include at least one program product, which has a set of (such as at least one) program module configured to perform the functions of the embodiments of the present disclosure.

A program/utility 5025 having a set of (at least one) program module 5024 may be stored, for example, in the system memory 502. The program module 5024 includes, but are not limited to: an operating system, one or more application programs, other program modules and program data. Each or some combination of these examples may include the implementation of the network environment. The program module 5024 generally performs the functions and/or methods in the embodiments described in the present disclosure.

The computing device 50 may also communicate with one or more peripheral equipment 504 (such as, keyboards, pointing devices, displays). Such communication may be performed through input/output (I/O) interface 505. In addition, the computing device 50 may also communicate with one or more networks (for example, local area network (LAN), wide area network (WAN), and/or public networks, such as the Internet) through a network adapter 506. As shown in FIG. 17, the network adapter 506 communicates with other modules of the computing device 50 (such as the processing unit 501) through the bus 503. It should be appreciated that although not shown in FIG. 17, other hardware and/or software modules may be used in conjunction with computing device 50.

The processing unit 501 performs various functional applications and data processing by executing the program stored in the system memory 502. The various functional applications and data processing includes: for example, acquiring a first image component, where the first image component includes an image component of a capsule seam in a preset channel; in the first image component, the image component of the capsule seam in the preset channel has step change; performing a highlighting process on the first image component according to an insertion direction from the capsule cap to the capsule body to obtain a second image component, where the second image component at least includes an enhanced capsule seam feature; and performing noise reduction and compensation on the second image component to obtain a target image component, where the target image component includes a complete outline of the capsule seam. The specific implementation manner of each step is not be repeated here. It should be noted that, although several units/modules or subunits/submodules of the apparatus for acquiring a capsule seam image are mentioned in the above detailed description, this division is only exemplary and not mandatory. Actually, according to the embodiment of the present disclosure, the features and functions of two or more units/modules described above may be embodied in one unit/module. Conversely, the features and functions of one unit/module described above can be further divided to be embodied by multiple units/modules.

In addition, while operations of the method according to the present disclosure are depicted in the figures in a particular order, there is no requirement or implication that these operations must be performed in that particular order, or that all illustrated operations must be performed to achieve desirable results. Additionally or alternatively, certain steps may be omitted, multiple steps may be combined into one step for execution, and/or one step may be decomposed into multiple steps for execution. Although the spirit and principle of the present disclosure have been described with reference to several specific embodiments, it should be understood that the present disclosure is not limited to the specific embodiments, and the division of various aspects does not mean that the features in these aspects cannot be combined to achieve benefit, the division is only for the convenience of expression. The disclosure is intended to cover various modifications and equivalent arrangements included within the spirit and scope of the appended claims.

What is claimed is:

1. A method for acquiring a capsule seam image, the method being applied in machine vision-based detection of capsule surface defects, a capsule cap and a capsule body of a capsule having a same color at an insertion position between the capsule cap and the capsule body, the method comprising:

acquiring a first image component, wherein the first image component comprises an image component of a capsule seam in a preset channel, and the preset channel is a brightness channel;

in the first image component, the image component of the capsule seam in the preset channel has a step change;

performing a highlighting process on the first image component according to an insertion direction from the capsule cap to the capsule body to obtain a second image component, wherein the second image component at least comprises an enhanced capsule seam feature; and performing noise reduction and compensation on the second image component to obtain a target image component, wherein the target image component comprises a complete outline of the capsule seam;

wherein the noise reduction and compensation performed on the second image component comprises an adaptive thresholding process and a global thresholding process, and a filtering process and/or a morphological process.

2. The method for acquiring a capsule seam image according to claim 1, wherein the preset channel comprises the brightness channel, before acquiring the first image component, the method further comprises:

acquiring a to-be-detected capsule image;

acquiring a first image from the to-be-detected capsule image according to a preset rule, wherein the first image comprises an image of the capsule seam, and the preset rule is determined based on capsule parameter with a plurality of specifications and a preset detection redundancy quantity; and converting the first image to a preset color model to obtain the first image component, wherein the preset color model is an Hue, Saturation, Value (HSV) color model.

3. The method for acquiring a capsule seam image according to claim 2, wherein the capsule parameters comprise capsule total lengths with a plurality of specifications, capsule cap lengths with a plurality of specifications and capsule body lengths with a plurality of specifications; and the preset detection redundancy quantity comprises a proportion of the capsule seam in the whole capsule and an image acquisition redundant angle.

4. The method for acquiring a capsule seam image according to claim 1, wherein the performing a highlighting process on the first image component according to an insertion direction from the capsule cap to the capsule body to obtain a second image component comprises:

taking a derivative of the first image component according to the insertion direction from the capsule cap to the capsule body, and taking an absolute value of the derivative to obtain the second image component.

5. The method for acquiring a capsule seam image according to claim 4, wherein matrix calculation is performed between a Sobel operator and the first image component to simulate and approximate an operation of taking the derivative of the first image component according to the insertion direction from the capsule cap to the capsule body, to obtain the second image component that is approximate to the derivative.

6. The method for acquiring a capsule seam image according to claim 1, wherein the performing noise reduction and compensation on the second image component to obtain a target image component comprises:

performing the adaptive thresholding process and the global thresholding process on the second image component respectively, and taking an intersection between a result of the adaptive thresholding process and a result of the global thresholding process to obtain a candidate target image component; and performing at least one of the filtering process and the morphological process on the candidate target image component to obtain the target image component, wherein the morphological process at least comprises a morphological closing operation.

7. A non-transitory computer-readable storage medium comprising instructions, the instructions, when being executed on a computer, causing the computer to perform the method according to claim 1.

8. A computing device comprising a memory, a processor, and computer programs which are stored on the memory and operable on the processor, wherein the processor, when executing the computer programs, performs the method according to claim 1.

\* \* \* \* \*